United States Patent [19]

Johnson, Jr.

[11] Patent Number: 4,788,009

[45] Date of Patent: Nov. 29, 1988

[54] METHOD OF PREPARING ROSIN ESTERS OF IMPROVED THERMAL STABILITY WITH INORGANIC SALT OF PHOSPHOROUS OR HYPOPHOSPHOROUS ACID

[75] Inventor: Robert W. Johnson, Jr., Savannah, Ga.

[73] Assignee: Union Camp Corporation, Wayne, N.J.

[21] Appl. No.: 931,532

[22] Filed: Nov. 14, 1986

[51] Int. Cl.$^4$ ................................................ C09F 1/00
[52] U.S. Cl. ..................................... 260/104; 260/103
[58] Field of Search ............................... 260/104, 103

[56] References Cited

U.S. PATENT DOCUMENTS 4,659,514  4/1987  Beuke ................................ 260/104

OTHER PUBLICATIONS

Organophosphorus Monomers and Polymers; Gefter, 1962, p. X.

Primary Examiner—Harold D. Anderson
Attorney, Agent, or Firm—Edward J. Sites

[57] ABSTRACT

Alkali metal and alkaline earth metal salts of hypophosphorous and phosphorous acid are used to catalyze the esterification of rosin with a polyol. The method is an improvement in that reaction time is shortened and the ester product exhibits improved color and thermal stability.

12 Claims, No Drawings

METHOD OF PREPARING ROSIN ESTERS OF IMPROVED THERMAL STABILITY WITH INORGANIC SALT OF PHOSPHOROUS OR HYPOPHOSPHOROUS ACID

The invention relates to methods of preparing esters of rosin and more particularly relates to the preparation of polyol esters of tall oil rosin.

BACKGROUND OF THE INVENTION

The prior art is replete with descriptions of methods for preparing polyol esters of rosin. Representative of such descriptions are those found in the U.S. Pat. Nos. 2,369,125; 2,729,660; 3,780,012; 3,780,013; 4,548,746; and 4,585,584.

The method of the present invention is an improvement over prior art methods in that it results in an ester product of improved hot-melt properties. The improved rosin esters are particularly useful as tackifier components in hot-melt adhesive compositions which normally include a rosin derivative tackifier.

SUMMARY OF THE INVENTION

The invention comprises a method of preparing a polyol ester of rosin, which comprises; esterifying the rosin with the polyol in the presence of a catalytic proportion of a compound selected from the group consisting of alkali metal salts of phosphorous acid, alkaline earth metal salts of phosphorous acid, alkali metal salts of hypophosphorous acid, alkaline earth metal salts of hypophosphorous acid, ammonium salts of phosphorous acid or ammonium salts of hypophosphorous acid.

The term "alkali metal" is employed herein in its usual sense as embracive of lithium, sodium, potassium, rubidium and cesium.

The term "alkaline earth metal" as used herein is inclusive of calcium, barium and strontium.

DETAILED DESCRIPTION OF THE PREFERRED EMBODIMENTS OF THE INVENTION

The rosins which may be esterfied by the method of the invention are well known compounds as are methods of their preparation. Rosin is mainly a mixture of $C_{20}$, fused-ring, monocarboxylic acids, typified by levopimaric and abietic acids. The rosins include gum rosin, wood rosin and tall oil rosin. The method of the invention is particularly advantageous when applied to esterification of tall oil rosin. The rosin may be hydrogenated, disproportionated or polymerized rosin as well as crude, untreated rosin.

The polyols employed in the method of the invention are also well known and are represented by diols such as ethylene glycol, propylene glycol, diethylene glycol, triethylene glycol, tetraethylene glycol, trimethylene glycol; triols such as glycerol; tetrols such as pentaerythritol; hexols such as mannitol and sorbitol and like polyols. The method of the invention is particularly advantageous when the polyol selected is pentaerythritol or glycerol.

The esterification of the invention is carried out in the presence of a catalytic proportion of one of the catalyst compounds described above. A catalytic proportion is generally within the range of from about 0.02 to 1.0 percent by weight of the rosin, preferably 0.1 to 0.5 percent.

Representative of the preferred catalysts employed in the method of the invention are sodium hypophosphite, potassium hypophosphite, calcium hypophosphite, barium hypophosphite, sodium phosphite, potassium phosphite, calcium phosphite, barium phosphite, ammonium hypophosphite, ammonium phosphite and the like, all of which are well known as are the methods of their preparation.

Esterification is advantageously carried out by bringing together the rosin and an equivalent excess of the polyol (up to 20 percent excess) in an appropriate reaction vessel and heating the mixture to a temperature within the range of from about 150° C. to 300° C., preferably 180° C. to 280° C.

Esterification may be carried out under a broad range of pressure conditions including sub-, super- and admospheric pressures are employed.

Advantageously, the esterification reaction can be accomplished in the presence of an inert atmosphere, such as a nitrogen gas atmosphere provided by a nitrogen purge of the reaction vessel prior to addition of the reactants and a nitrogen sparge during the reaction. Since light color is a desirable property of the rosin ester and the color is sensitive to oxygen exposure, oxygen exposure is preferably minimized.

Progress of the esterification may be followed by conventional analyses of the reaction mixture to determine the acid number. The esterification may be terminated to any desired acid number. In general, the reaction is accepted as sufficiently complete when the acid number drops to 15 or lower.

The following examples describe the manner and the process of making and using the invention and set forth the best mode of carrying out the invention, but are not to be considered as limiting the invention.

The softening points (S.P.) were determined by the Ball and Ring method of ASTM test method 28-58T.

EXAMPLE 1

This is not an example of the invention, but is made for purposes of comparison.

To a suitable reaction vessel equipped with a stirrer and thermometer were added 100 parts of disproportionated tall oil rosin having a color of 4 Gardner. There are next added 11 parts of pentaerythritol and 0.10% lithium carbonate as the catalyst, based on the weight of the rosin. The mixture was heated to 275° C. for about eight hours. The resultant rosin pentaerythritol ester had a color of 6 Gardner, an acid number of 9.3 and a softening point of 99° C.

EXAMPLE 2

This is not an example of the invention, but is a control made for comparative purposes.

The procedure of Example 1, supra, was repeated except that the pentaerythritol as used therein was replaced with an equal proportion of glycerol. The resultant rosin glycerol ester had a color of 4, an acid number of 4.0 and a softening point of 88° C.

EXAMPLE 3

The procedure of Example 1, supra, was repeated except 0.2% sodium phosphite was used as catalyst instead of lithium carbonate, and the mixture was heated to 275° C. for 5 hours. The catalyst was removed by filtration. The resultant ester had a color of 5+ Gardner, an acid number of 4 and a S.P. of 100° C.

EXAMPLE 4

The procedure of Example 2, supra, was repeated except 0.1% catalyst was used instead of 0.2% and glycerol (10.4 parts) were used instead of pentaerythritol. The resultant ester had a color of 4 Gardner, an acid number of 6 and a S.P. of 88° C.

EXAMPLE 5

Hot-melt adhesives were made up and then tested by heating to 175° C. in a forced air oven and observing the percentage of skinning which occurred over periods of time and the degree of viscosity change. The test results are given in the Table 1, below, together with the acid numbers (AN), softening point (S.P.) and color of the resins.

EXAMPLE 6

The procedure of Example 1, supra, was repeated except that 0.1% sodium hypophosphite was used as catalyst instead of calcium oxide. The mixture was heated to 275° for 5 hours. The catalyst was removed by filtration. The resultant ester had a color of 4 Gardner, an acid number of 6 and a S.P. of 101° C.

TABLE I

| Example | Polyol | AN | S.P. (°C.) | Color, G | Color, G Initial | Final | Skinning, % 24 Hr | 48 Hr | 96 Hr | Viscosity Change, % |
|---|---|---|---|---|---|---|---|---|---|---|
| 1 | PE* | 10 | 99 | 6 | 5− | 12 | 35 | 50 | 70 | −20 |
| 2 | Glycerol | 4 | 88 | 4 | °3 | 11+ | 30 | 45 | 75 | −9 |
| 3 | PE* | 4 | 100 | 5+ | 5− | 10+ | 0 | 25 | 30 | +2 |
| 4 | Glycerol | 6 | 88 | 4 | 3+ | 11+ | 0 | 10 | 10 | 0 |

*Pentaerythritol.

EXAMPLE 7

The procedure was carried out as in Example 6 except ammonium hypophosphite was used instead of sodium hypophosphite and the mixture was heated to 275° for 5½ hours. No filtration was required. The resultant ester had a color of 5 Gardner, an acid number of 7 and a S.P. of 100° C.

EXAMPLE 8

The procedure was carried out as in Example 6 except glycerol was used (10.4 parts) instead of pentaerythritol. The resultant ester had a color of 4+ Gardner, an acid number of 9 and a S.P. of 89° C.

EXAMPLE 9

The procedure was carried out as in Example 8, supra, except that 0.2% calcium hypophosphite was used instead of sodium hypophosphite and the mixture was heated to 275° for 4½ hours. The resultant ester had a color of 4- Gardner, an acid number of 10 and a S.P. of 89° C.

EXAMPLE 10

The hot-melt properties are shown in Table II, below and show definite improvement in most properties when compared to an ester prepared as in the comparative examples.

TABLE II

| | | | Ester Properties | | | Hot Melt Properties Color, G | | Skinning, % | | | Viscosity |
|---|---|---|---|---|---|---|---|---|---|---|---|
| Example | Catalyst | Polyol | AN | S.P. (°C.) | Color, G | Initial | Final | 24 Hr | 48 Hr | 96 Hr | Change, % |
| 1 | Li$_2$CO$_3$ | PE* | 10 | 99 | 6 | 5− | 12 | 35 | 50 | 70 | −20 |
| 2 | Li$_2$CO$_3$ | Glycerol | 4 | 88 | 4 | 3 | 11+ | 30 | 45 | 75 | −9 |
| 6 | NaH$_2$PO$_2$ | PE* | 6 | 101 | 4 | 4− | 11 | 0 | 0 | 30 | +15 |
| 7 | NH$_4$H$_2$PO$_2$ | PE* | 7 | 100 | 5 | 5− | 8+ | 0 | 1 | 3 | +25 |
| 8 | NaH$_2$PO$_2$ | Glycerol | 9 | 89 | 4+ | 3 | 12− | 0 | 5 | 20 | 0 |
| 9 | CaH$_2$PO$_2$ 2 | Glycerol | 10 | 89 | 4− | 3+ | 11− | 0 | 5 | 10 | 10 0 |

*Pentaerythritol.

What is claimed is:

1. A method of preparing a polyol ester of rosin, which comprises; esterifying the rosin with the polyol in the presence of a catalytic proportion of a catalyst compound selected from the group consisting of alkali metal salts of phosphorous acid, alkaline earth metal salts of phosphorous acid, alkali metal salts of hypophosphorous acid or alkaline earth metal salts of hypophosphorous acid.

2. The method of claim 1 wherein the rosin is tall oil rosin.

3. The method of claim 2 wherein the rosin is a disproportionated rosin.

4. The method of claim 1 wherein the polyol is pentaerythritol.

5. The method of claim 1 wherein the polyol is glycerol.

6. The method of claim 1 wherein the proportion of catalyst is within the range of from about 0.01 to 1.0 percent by weight of the rosin.

7. The method of claim 6 carried out at a temperature within the range of from about 150° C. to 300° C.

8. The method of claim 1 carried out under an inert gas atmosphere.

9. The method of claim 1 wherein the compound selected is sodium hypophosphite.

10. The method of claim 1 wherein the compound selected is sodium phosphite.

11. The method of claim 1 wherein the compound selected is calcium hypophosphite.

12. The method of claim 1 wherein the compound selected is ammonium hypophosphite.

* * * * *